(12) United States Patent
Wang

(10) Patent No.: US 6,583,571 B1
(45) Date of Patent: Jun. 24, 2003

(54) EMERGENCY ILLUMINATOR

(76) Inventor: Kuan Yun Wang, No. 3, Lane 414, Sec. 2, An Kang Rd., Hsintien City, Taipei Hsien (TW)

( * ) Notice: Subject to any disclaimer, the term of this patent is extended or adjusted under 35 U.S.C. 154(b) by 5 days.

(21) Appl. No.: 10/023,656

(22) Filed: Dec. 21, 2001

(51) Int. Cl.$^7$ ............................................. H05B 37/00
(52) U.S. Cl. ..................... 315/86; 315/160; 315/226; 315/308; 307/64; 307/66
(58) Field of Search ..................... 315/86, 160, 161, 315/171, 172, 175, 200 R, 308, 223, 226; 307/64, 66, 85; 323/222, 282; 340/333, 636; 363/125; 362/800

(56) References Cited

U.S. PATENT DOCUMENTS

| | | | |
|---|---|---|---|
| 4,216,410 A | * 8/1980 | Feldstein | 315/86 |
| 5,365,145 A | * 11/1994 | Fields | 315/86 |
| 5,446,440 A | * 8/1995 | Gleason et al. | 340/331 |
| 5,739,639 A | * 4/1998 | Johnson | 315/86 |
| 5,811,938 A | * 9/1998 | Rodriguez | 315/86 |
| 5,847,550 A | * 12/1998 | Schie et al. | 323/222 |
| 6,057,609 A | * 5/2000 | Nagai et al. | 307/66 |
| 6,160,727 A | * 12/2000 | Liao et al. | 363/125 |

* cited by examiner

*Primary Examiner*—Haissa Philogene
(74) *Attorney, Agent, or Firm*—Rosenberg, Klein & Lee

(57) ABSTRACT

An emergency illuminator includes a rectifying circuit for converting an input AC voltage to a DC voltage; an electric magnetic device having a primary side coil electrically connected to an output end of the rectifying circuit and a secondary side coil, wherein the secondary side coil becomes conductive when the AC voltage is interrupted; at least one lighting device having an anode electrically connected to a node of the secondary side coil of the electric magnetic device; a battery having a positive end electrically connected to the anode of the lighting device for providing the lighting device with working power; a control circuit electrically connected to a common end of the secondary side coil of the electric magnetic device, cathode of the lighting device, and a negative end of the battery.

7 Claims, 5 Drawing Sheets

EMERGENCY ILLUMINATOR

BACKGROUND OF THE INVENTION

1. Field of the Invention

The present invention relates to the field of an emergency illuminator with low power dissipation, and more particularly, to an energy-saving, cost-effective emergency illuminator that can be made small in size.

2. Description of the Prior Art

Emergency lights and emergency lighting provide lighting in corridors, stairwells, ramps, escalators, aisles, and exit passageways during power outages. If the emergency light fails to operate properly, the building occupants can become disoriented.

Typically, the power for the emergency lights is provided by a relay and a rechargeable storage battery. However, conventional rechargeable battery installed in the emergency lights cannot keep long, typically 3 to 4 hours mostly. Besides, the conventional emergency illuminators are costly and are not space-saving.

SUMMARY OF THE INVENTION

It is therefore a primary object of the present invention to provide an emergency illuminator that can be made small in size. The emergency illuminator in accordance with this invention is energy-saving and cost-effective.

According to the claimed invention, the emergency illuminator includes a rectifying circuit for converting an input AC voltage to a DC voltage; an electric magnetic device having a primary side coil electrically connected to an output end of the rectifying circuit and a secondary side coil, wherein the secondary side coil becomes conductive when the AC voltage is interrupted; at least one lighting device having an anode electrically connected to a node of the secondary side coil of the electric magnetic device; a battery having a positive end electrically connected to the anode of the lighting device for providing the lighting device with working power; a control circuit electrically connected to a common end of the secondary side coil of the electric magnetic device, a cathode of the lighting device, and a negative end of the battery.

The control circuit drives the lighting device to turn on when the secondary side coil of the electric magnetic device becomes conductive.

It is to be understood that both the forgoing general description and the following detailed description are exemplary, and are intended to provide further explanation of the invention as claimed. Other advantages and features of the invention will be apparent from the following description, drawings and claims.

DETAILED DESCRIPTION OF THE PREFERRED EMBODIMENT

Figure 1:
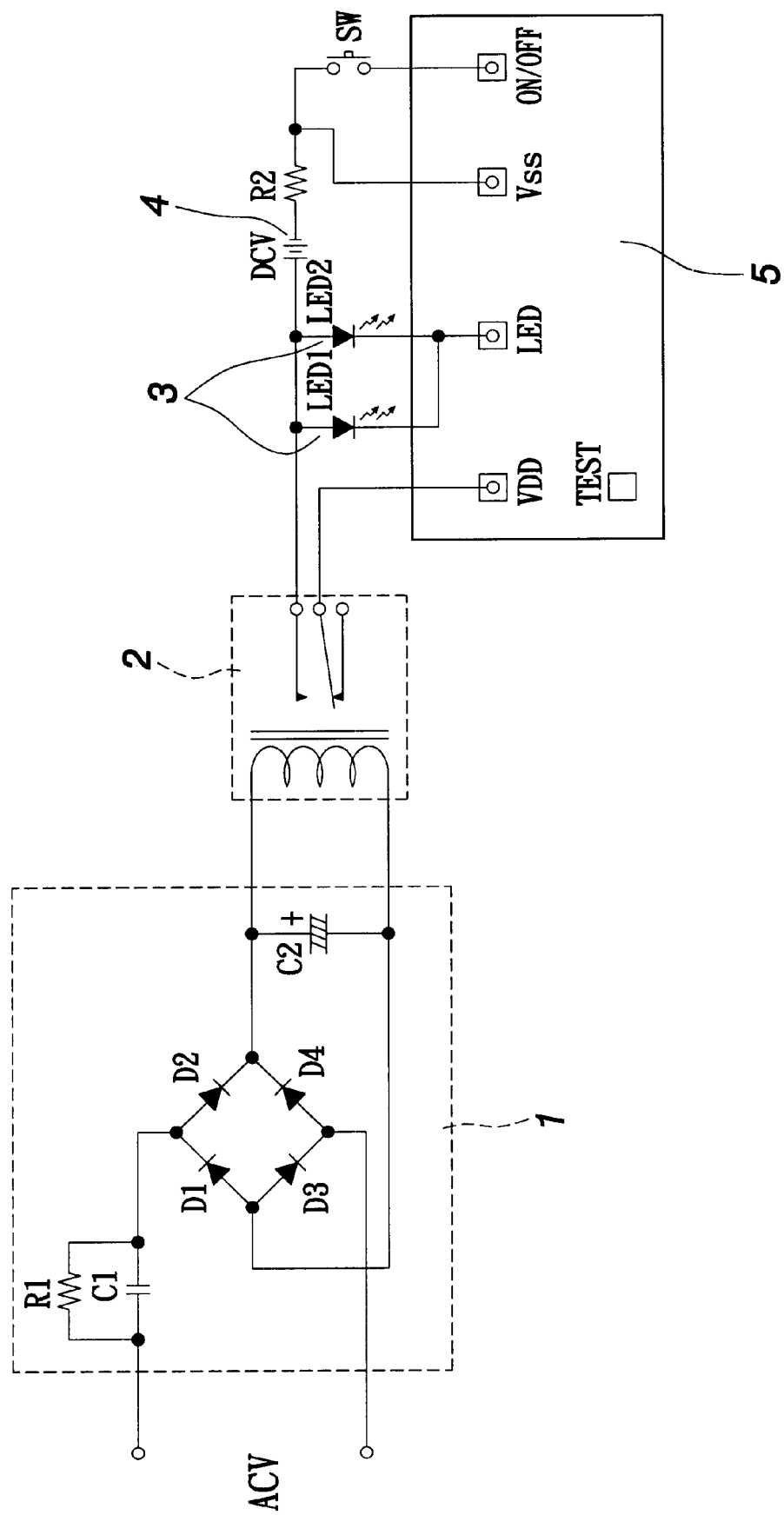
FIG. 1 is a circuit diagram of an emergency illuminator according to one preferred embodiment of this invention.

Please refer to FIG. 1. FIG. 1 is a circuit diagram of an emergency illuminator according to one preferred embodiment of this invention. As shown in FIG. 1, reference numeral 1 denotes a rectifying circuit. An electric magnetic device 2 is coupled with the rectifying circuit 1. At least one lighting device 3, a battery 4, a control circuit 5, and a switch device (SW) are provided.

The rectifying circuit 1 comprises diodes D1–D4, resistor R1, and capacitors C1 and C1. As known by those skilled in the art, the rectifying circuit 1 is used to convert an input commercial AC voltage (AVC) to a DC voltage.

The electric magnetic device 2 may be a relay having a primary side coil electrically connected to an output terminal of the rectifying circuit 1. The electric magnetic device 2 has a secondary side coil that is switched on (becomes conductive) while electric power cut.

Anodes of the lighting devices 3 are electrically connected to the secondary side coil of the electric magnetic device 2. In this preferred embodiment, the lighting devices 3 are two white light LEDs.

The battery 4 has a positive electrode (+) electrically connected to the anode of the lighting device 3 for providing the lighting devices with proper working power. The battery 4 may be two or more lithium batteries or dry batteries that are connected in series.

The control circuit 5 is an IC that controls the on/off states of the lighting devices 3. The control circuit 5 has a VDD terminal electrically connected to a common end of the secondary side coil of the electric magnetic switch device 2 and an LED terminal electrically connected to a cathode terminal of the lighting device 3. A VSS terminal of the control circuit 5 is electrically connected to negative electrode (−) of the battery 4. A resistor R2 is located between the battery 4 and the VSS terminal of the control circuit 5. The control circuit 5 drives the lighting device 3 to turn on when the secondary side coil of the electric magnetic device 2 becomes conductive.

The switch device SW has one end electrically connected to the ON/OFF end of the control circuit 5 and a second end electrically connected to the negative electrode (−) of the battery 4. The switch device SW may be used to test the on/off states of the lighting device 3.

Figure 2:
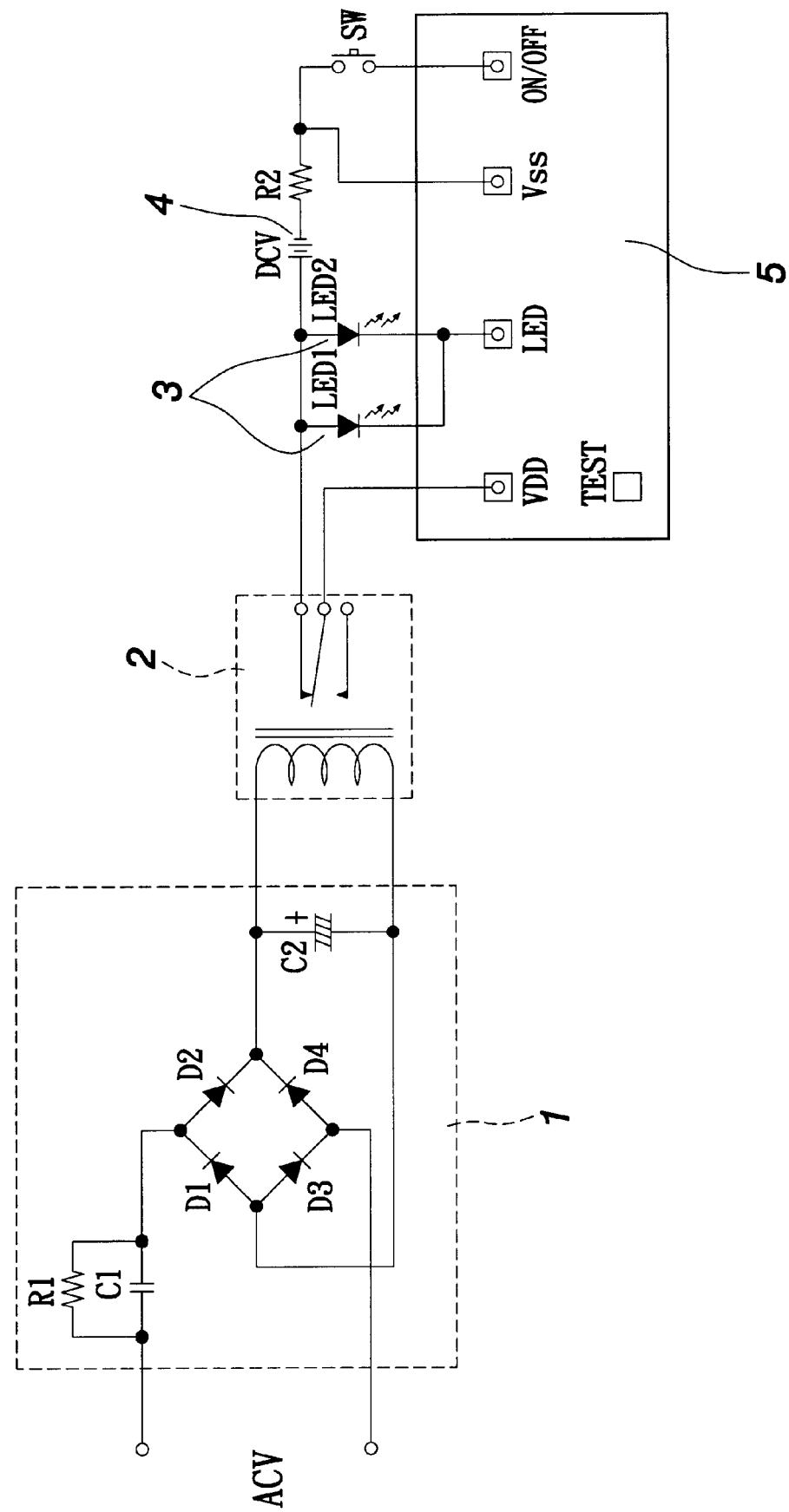
FIG. 2 is a circuit diagram of an activated emergency illuminator.

As shown in FIG. 1, when the commercial AC voltage is not interrupted, the electric magnetic device 2 is not activated, and the lighting device 3 is thereby in an off state. When the commercial AC voltage is cut, the secondary side coil of the electric magnetic device 2 becomes conductive, as shown in FIG. 2, the lighting device 3, which is driven by the control circuit 5, switches on.

Figure 5:
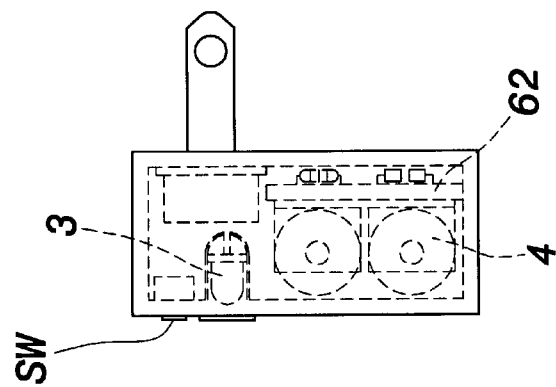
FIG. 4 and FIG. 5 are cross sectional diagrams of the emergency illuminator of FIG. 3.
Figure 4:
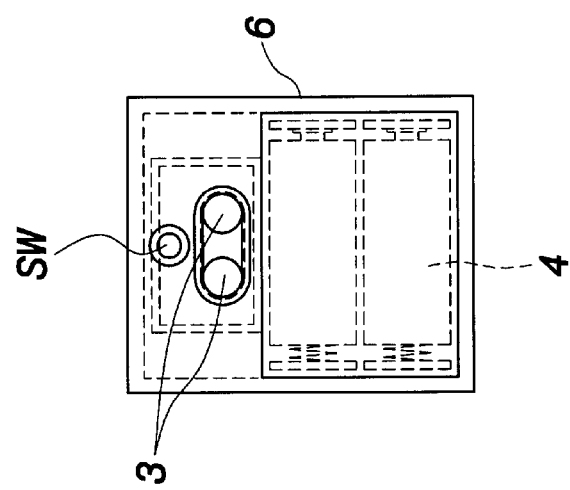
Figure 3:
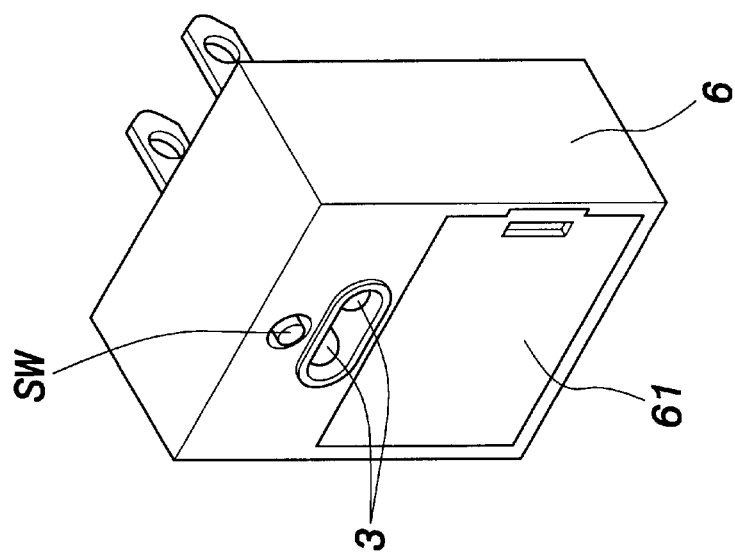
FIG. 3 is a perspective view of the emergency illuminator in accordance with the present invention.

Please refer to FIG. 3 to FIG. 5. FIG. 3 is a perspective view of the emergency illuminator in accordance with the present invention. FIG. 4 and FIG. 5 are cross sectional diagrams of the emergency illuminator of FIG. 3. The rectifying circuit 1, electric magnetic device 2, and control circuit 5 are installed together on a substrate 62 mounted within a portable casing 6. The rectifying circuit 1, electric magnetic device 2, and control circuit 5 are electrically connected to the associated devices or terminals such as lighting device 3 and switch device SW in a configuration as mentioned above. As shown in FIG. 3, the lighting device 3 has an exposed light-emitting portion and the switch device SW has an exposed operating member for a user. As shown in FIG. 4 and FIG. 5, the battery 4 is installed in place within the casing 6. A lid 61 is provided to cover the battery 4.

Figure 6:
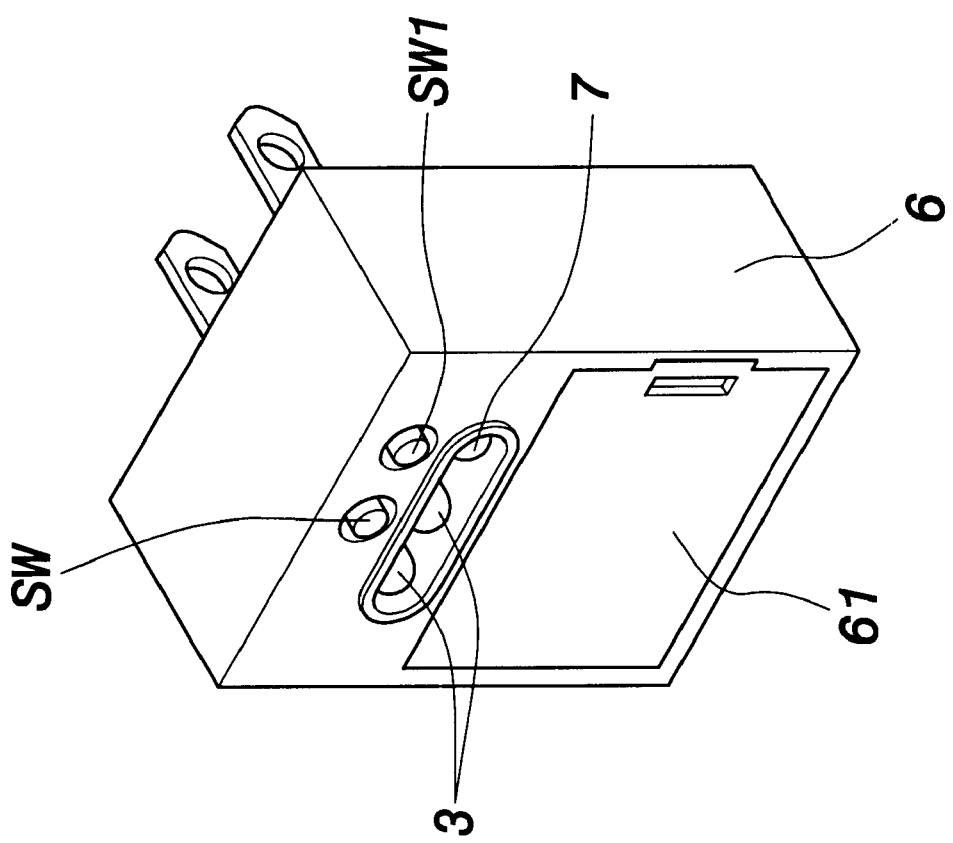
FIG. 6 is a perspective view of a second preferred embodiment of this invention.
Figure 7:
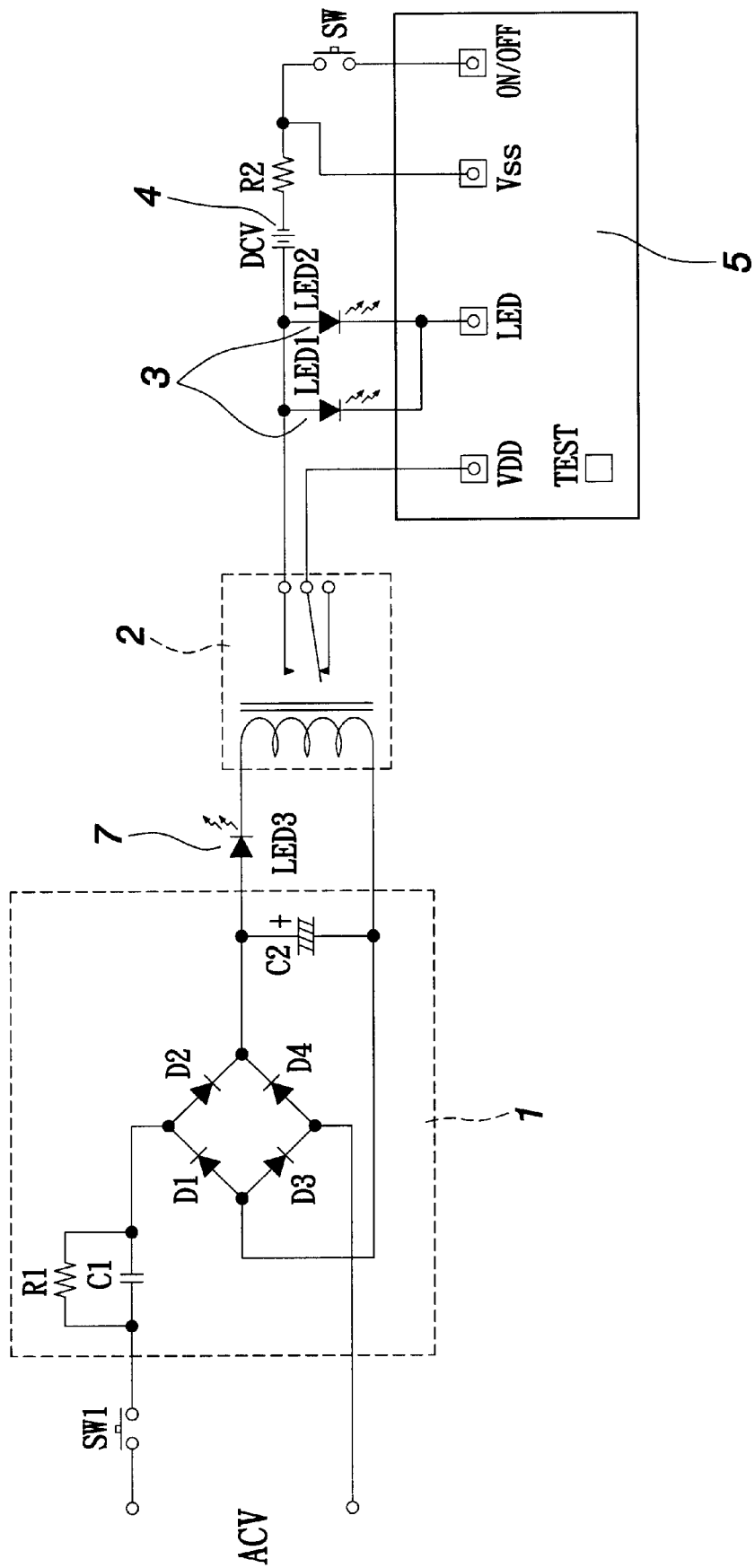
FIG. 7 is a circuit diagram of the second embodiment of this invention.

Please refer to FIG. 6 and FIG. 7 of a second preferred embodiment of this invention. An additional switch device SW1 is electrically connected to an input end of the rectifying circuit 1. Further, the output end of the rectifying circuit 1 is electrically connected to an additional LED 7 serving as a small night lamp. The LED 7 emits light when the switch device SW1 becomes conductive and the AC voltage is not interrupted.

In contrast to the prior art, this invention provides an emergency illuminator having the following advantages: 1. the circuit is improved so that the emergency illuminator is energy-saving; 2. the emergency illuminator can be made small in size; 3. the present invention takes advantages of white light LEDs to cost down; and 4. the emergency illuminator of this invention may have night light function.

Those skilled in the art will readily observe that numerous modification and alterations of the device may be made while retaining the teachings of the invention. Accordingly, the above disclosure should be construed as limited only by the metes and bounds of the appended claims.

What is claimed is:

1. An energy-saving emergency illuminator, comprising:
   a rectifying circuit for converting an input AC voltage to a DC voltage;
   an electric magnetic device having a primary side coil electrically connected to an output end of the rectifying circuit and a secondary side coil, wherein the secondary side coil becomes conductive when the AC voltage is interrupted;
   at least one lighting device having an anode electrically connected to a node of the secondary side coil of the electric magnetic device;
   a battery having a positive end electrically connected to the anode of the lighting device for providing the lighting device with working power; and
   a control circuit electrically connected to a common end of the secondary side coil of the electric magnetic device, a cathode of the lighting device, and a negative end of the battery;
   wherein the control circuit drives the lighting device to turn on when the secondary side coil of the electric magnetic device becomes conductive.

2. The emergency illuminator of claim 1 wherein the control circuit is electrically connected to the negative end of the battery through a first switch device for testing the ON/OFF states of the lighting device.

3. The emergency illuminator of claim 1 wherein the battery is a lithium battery or a dry battery.

4. The emergency illuminator of claim 1 wherein the electric magnetic device is a relay.

5. The emergency illuminator of claim 1 wherein the lighting device is a white light LED.

6. The emergency illuminator of claim 1 wherein the rectifying circuit, the electric magnetic device, the battery and the lighting device are housed by a casing, and wherein the lighting device has an exposed light-emitting portion.

7. The emergency illuminator of claim 1 wherein the rectifying circuit has an input end electrically connected to a second switch device and an output end electrically connected to an LED serving as a small night lamp.

* * * * *